(No Model.)

B. A. GOODWIN.
TRACE HOOK.

No. 591,038. Patented Oct. 5, 1897.

Witnesses:

Inventor
B. A. Goodwin
By James J. Sheehy
Attorney

UNITED STATES PATENT OFFICE.

BENJAMIN A. GOODWIN, OF RIPON, CALIFORNIA.

TRACE-HOOK.

SPECIFICATION forming part of Letters Patent No. 591,038, dated October 5, 1897.

Application filed April 19, 1897. Serial No. 632,881. (No model.)

*To all whom it may concern:*

Be it known that I, BENJAMIN A. GOODWIN, a citizen of the United States, residing at Ripon, in the county of San Joaquin and State of California, have invented certain new and useful Improvements in Trace-Hooks; and I do declare the following to be a full, clear, and exact description of the invention, such as will enable others skilled in the art to which it appertains to make and use the same.

My invention relates to improvements in that class of hooks which are designed more especially for use on traces or tugs for detachably connecting the same to chains attached to singletrees; and it has for its general object to provide a cheap, simple, and durable hook adapted to be readily connected to and disconnected from a link of a chain when desired, and one which is so constructed that there is no liability of its being casually disconnected from the link of the chain when in use.

The invention will be fully understood from the following description and claims when taken in conjunction with the annexed drawings, in which—

Figure 1:
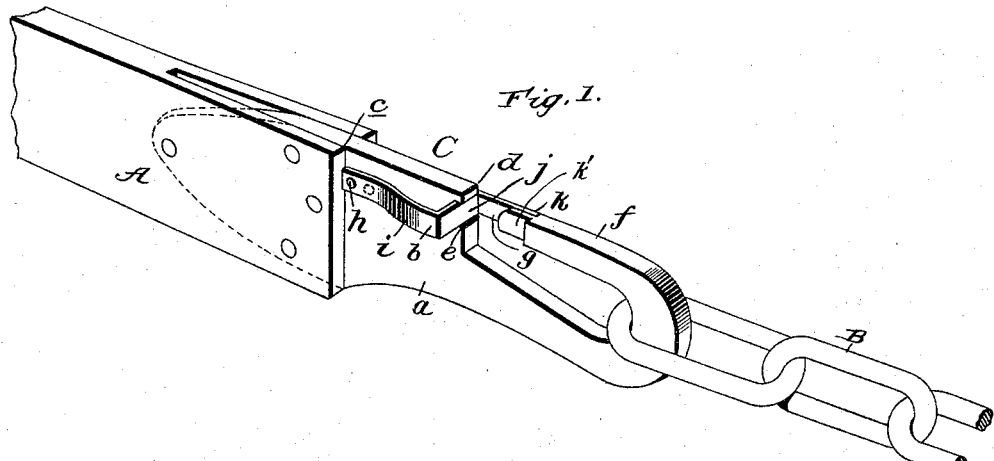
Figure 2:
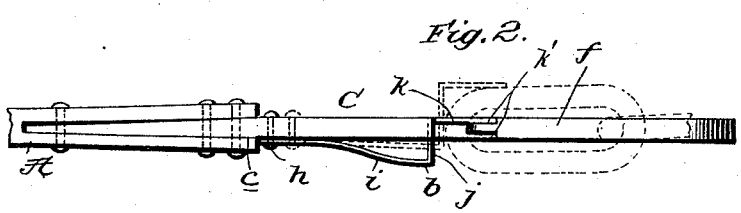
Figure 3:
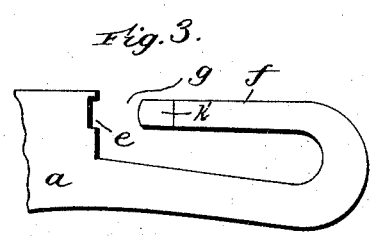

Figure 1 is a perspective view illustrating my improved hook as attached to a trace or tug and connected to a link of a chain. Fig. 2 is a plan view of the same, the chain-link being shown by dotted lines; and Fig. 3 is a side elevation of a portion of the hook-body.

Referring by letter to the said drawings, A indicates a portion of a trace or tug.

B indicates a chain such as is ordinarily connected to a single or double tree of a wagon, and C indicates my improved hook. This hook C comprises a body $a$, which is by preference cast or otherwise formed in one piece of iron or other suitable material, and a tongue $b$, which is formed of spring-steel or other material suitable to the purpose.

The body $a$ of the hook is provided with a preferably flat shank $c$ for convenient connection to the trace A, and this shank is shouldered at $d$ and provided in said shoulder with a recess $e$ and terminates at its forward end in the hook $f$, between the free end of which and the shoulder $d$ is left a space $g$ for the introduction of a link of the chain B.

The tongue $b$ is connected to the side of the shank $c$ by one or more rivets $h$ or other suitable means, and it is bent outwardly, as indicated by $i$, and is then bent so as to form the transversely-disposed portion $j$, which rests in the recess $e$ of the shoulder $d$, and the longitudinally-disposed end portion $k$, which normally rests in a rabbet $k'$ at the free end of the hook-body and flush with the side of the said hook-body $a$ opposite to that to which the tongue is connected. In virtue of the tongue being arranged as described it will be observed that when it is desired to connect a link of the chain B to the hook it is simply necessary to press with the thumb against the portion $i$ of the tongue and move said tongue into the position shown by dotted lines in Fig. 2, when the link may be readily placed in engagement with the hook through the space $g$. When pressure is removed from the portion $i$ of the said tongue, it will automatically assume the position shown by full lines in Figs. 1 and 2, and in this position will effectually prevent casual disconnection of the link from the hook, for it will be seen that all pressure of the link against the tongue will be in the direction of the greatest width thereof and in a direction in which the tongue cannot move because of its transverse portion $j$ being arranged in the recess $e$ of the body $a$. This recess $e$ in the body $a$ not only enables the spring-tongue to withstand the pressure of the link against it, but it also serves to guide the tongue in its lateral movements and takes all strain off the device or devices connecting the tongue to the body $a$ and permits of a single rivet being used for such connection.

It will be appreciated from the foregoing that in virtue of the construction of my improved hook it is practically impossible for the link of the chain to be casually disconnected from the hook; but while this is so the link may be as conveniently connected to and disconnected from the hook as when the ordinary snap-hook is employed. It will also be appreciated that when my improved hook is in use the portion $k$ of the tongue rests flush with the side of the body $a$, and that neither the part $k$ nor any of the other parts is liable to pinch or cut the animal or to catch any part of the harness.

While I have described my improved hook as being especially adapted for use as a tug or trace hook, I do not desire to be understood as confining myself to the same, as the hook may be put to any use to which it is applicable.

Having thus described my invention, what I claim is—

1. As an improved article of manufacture, the hook described comprising the body having the shoulder and the recess therein and terminating at its forward end in the hook, and the resilient tongue connected to one side of the body and formed in one piece with the outwardly-bent portion, the transversely-disposed portion adapted to rest and move in the recess in the shoulder of the body and the longitudinally-disposed end portion adapted to normally rest flat against one side of the body, substantially as specified.

2. As an improved article of manufacture, the herein-described hook comprising the body having the shoulder and the recess therein and terminating at its forward end in the hook having the rabbet $k'$, in one of its sides, and the resilient tongue connected to one side of the body and formed in one piece with the outwardly-bent portion, the transversely-disposed portion adapted to rest and move in the recess in the shoulder of the body and the longitudinally-disposed end portion adapted to normally rest in the rabbet $k'$, and flush with one side of the body, substantially as specified.

In testimony whereof I affix my signature in presence of two witnesses.

BENJAMIN A. GOODWIN.

Witnesses:
GEORGE RUSHFORTH,
A. M. NOBLE.